Feb. 9, 1965  T. E. McGINN  3,169,048
LOW-MELTING POINT COMPOSITE PRODUCT
Filed March 18, 1960

Thomas E. McGinn,
Inventor.
Koenig and Pope,
Attorneys.

3,169,048
LOW-MELTING POINT COMPOSITE PRODUCT
Thomas E. McGinn, Rehoboth, Mass., assignor to Texas Instruments Incorporated, Dallas, Tex., a corporation of Delaware
Filed Mar. 18, 1960, Ser. No. 15,938
6 Claims. (Cl. 29—183.5)

This invention relates generally to low-melting point products or materials and to a method of their manufacture, and more particularly to low-melting point composite materials.

Among the several objects of the invention may be noted the provision of composite materials having components adapted to be alloyed and simultaneously form low-melting point brazed or soldered joints between parts to be connected; the provision of composite materials of the class described which, although formed of components subject to embrittlement when alloyed, are nevertheless malleable in the composite state preceding alloying by firing to solder or braze; and the provision of materials of the class described which by a convenient and low-cost but accurate method of manufacture are produced in forms for nonbreakable transportation, and conversion thereafter by forming, punching, bending and the like into shapes desirable for soldering and brazing at predictable low-melting point temperatures. Other objects and features will be in part apparent and in part pointed out hereinafter.

The invention accordingly comprises the combinations of components, the proportions thereof, steps and sequence of steps, and features of compositions and manipulation, which will be exemplified in the products and methods hereinafter described, and the scope of which will be indicated in the following claims.

In the accompanying drawings, in which one of various possible embodiments of the invention is illustrated, FIG. 1 is a diagram illustrating a first step of my new process for forming my new product;

Corresponding reference characters indicate corresponding parts throughout the several views of the drawings.

The term low-melting point alloy, as it is applicable to the materials to which the invention relates, is defined herein as one having its components in such proportions by weight that the melting point is lower than that of the component having the higher melting point and may or may not be less than that of the component having the lower melting point. Such low melting point may, for example, be the eutectic temperature for a given system of alloys. It will be understood by those skilled in the art that metallurgical phase diagrams are commonly available in the literature for determining the various melting temperatures resulting from various component weight ratios which make up a given alloy, for the practice of the instant invention.

Among low melting point alloys useful for low-temperature brazing or soldering are some which are nonmalleable, i.e., brittle and liable to crack and break, especially in thin layers, thus considerably reducing their usefulness as brazing or soldering products in sheet, ribbon, or other forms, although embrittlement after a soldering or brazing operation may be of no consequence to their function as a joint between the parts joined thereby. Gold-tin, gold-aluminum and titanium-copper alloys are examples. Specifically, fine gold and substantially pure tin, above mentioned for example, will produce a brittle alloy when mixed by weight in the proportion of 80 gold to 20 tin and also in other low-melting point proportions within the definition of a low melting point alloy above given.

The general purpose of the invention is to provide as a brazing or soldering product, an adhered or physically bonded nonalloyed malleable assembly of brittle alloy forming components in a proportion adapted, upon firing in situ for brazing or soldering, to form a low melting point alloy as the firing proceeds, whereby the product before firing does not partake of the brittle characteristics of the resulting alloy.

Figure 1:
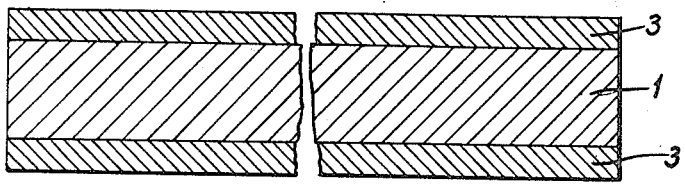

One example of the invention is illustrated in the drawings. Referring to FIG. 1, a block, sheet, strip or the like 1 of fine gold is provided on opposite faces with substantially pure tin cladding blocks, sheets, strips or the like 3, preferably of substantially equal interfacial areas. The ratio of total thicknesses of the intermediate gold 1 and tin cladding 3 are chosen for example to provide a low-melting point weight ratio of fine gold to pure tin of 80:20. Their absolute thicknesses are not critical, being such as to provide an ultimate desirable area of composite material after reduction in thickness, to be described.

Figure 2:
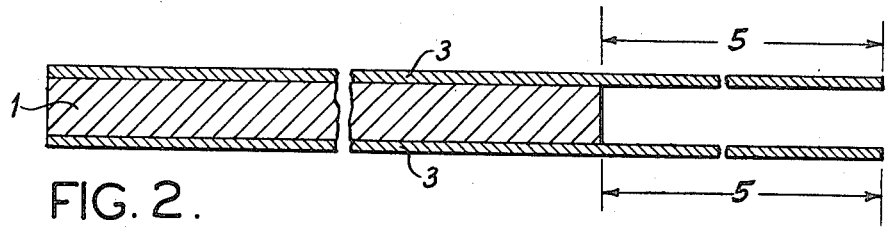
FIG. 2 is a diagram illustrating a second step.
Figure 3:
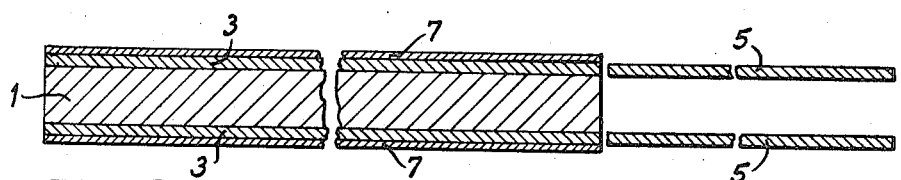
FIG. 3 is a diagram illustrating a third step.

The assembly such as shown in FIG. 1 is made after the faces to be contacted of the pieces 1 and 3 have as a preliminary step been suitably cleaned, as by wire brushing and heating or the equivalent, to remove bond-deterrent materials. Various means may then be employed for joining or adhering the layers 1 and 3, as for example by a solid-phase bond. This may be accomplished, for example, by rolling under pressure produced by a suitable reduction in thickness of the assembly 1, 3, as disclosed in U.S. Patent 2,691,815 or 2,753,623. A one-pass reduction of 50%–60% or so in thickness of the assembly has been found sufficient, although more may be used to establish a solid-phase bond which holds the sheets together as a composite malleable sheet or strip, considerably enlarged in area over that of the assembly shown in FIG. 1. A substantial amount of stretch-off will also occur in connection with the softer tin material 3, as illustrated at 5 in FIG. 2. Next the stretch-off 5 is severed, as illustrated in FIG. 3. This removed material is weighed. Then two additional sheets or ribbons 7 of pure tin are applied as shown in FIG. 3, totaling the same weight as that of the removed stretch-off material, each sheet being of an area substantially the same as an outside face area of the bonded assembly 1, 3. This occurs after the interfaces of materials 3 and 7 have been cleaned in the manner above described in connection with FIG. 1. In order to establish said equality to the weight of the removed stretch-off material 5, the sheets or ribbons 7 are of appropriate thicknesses. The purpose of this is to maintain in the assembly 1, 3, 7 the original weight ratio of gold to tin of approximately 80:20.

Figure 4:
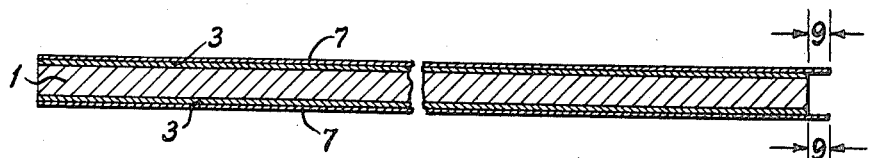
FIG. 4 is a digaram illustrating a fourth step and also illustrating the new product.

Further reduction of, for example, 25% or so by rolling is then carried out to solid-phase bond sheets 7 to sheets 3 with a result which may be as shown in FIG. 4, which indicates some but less stretch-off 9. This again is cut off. If the stretch-off 9 at this stage is appreciable, it again may be weighed and replaced on assembly 1, 3, 7 (after cleaning) by amounts of tin sheets or ribbons as above described, with subsequent rolling and bonding of the assembly with the replaced material. However, at this FIG. 4 stage the repetition of replacement of stretch-off material may become unnecessary, because of the inconsequential loss of tin upon the second reduction. In any event, at some stage of repetition of the process, replacement of removed stretch-off material will become unnecessary because the amount of stretch-off ultimately becomes so small as by its absence only negligibly to affect the desired final approximate 80:20 weight ratio of the bonded gold and tin. Thus it will be seen that the gold-tin weight ratio at the end of the process is substantially the same as at the beginning, i.e., 80:20 or thereabout. Finally, the material after the solid-phase bonding has been completed in the manner above described may be finish-rolled to a thinness of a few thousandths of an inch or less, as for example by a 10%–12% finishing reduction. While such a final thickness is desirable, as will appear, it is not critical.

It will be understood that the ratios of thicknesses of the layers 3, 1, 3 in FIG 1 are not in a direct proportion to the desired weight ratios of these layers because the densities of tin and gold are different, and therefore the weights per unit of areas of these materials are not in proportion to their thicknesses.

Another example will supply additional information as to practice of the invention in regard to gold and tin:

Two pure tin strips .0135" x 1⅛" x 2½", after cleaning were solid-phase bonded, as described, to a cleaned fine gold strip .060" x 1⅛" x 2½" with a 77% reduction. The starting weight of the gold was 53.00 grams and that of the tin was 9.20 grams, which is to say about 85% to 15% by weight of gold to tin. This resulted in an original reduced composite thickness of .020" with a stretch-off of tin of 0.50 gram. Then a piece of pure tin weighing 4.60 grams was rolled to the width and double the length of the bonded piece (minus the stretch-off). This was cut in two and again bonded to opposite sides of the original piece, from which had been removed the stretch-off material, with a reduction which resulted in .003" gauge with a tin stretch-off of 0.20 gram. The resulting assembly was finish-rolled to .001" in order to meet a specification requirement for such a final thickness. The addition of the 4.60 grams of tin to the 9.20-gram starting weight of tin added up to 13.80 grams. From this was subtracted the tin stretch-off weight of .050 gram and .020 gram (totaling .070 gram). Thus the final weight of tin was 13.10 grams. The final weight of gold remained at its starting weight of 53.00 grams. Adding the final weight of gold of 53.00 grams to the final weight of tin of 13.10 grams gave a total of 66.10 grams. Therefore, in the finished product the ratio of gold to tin was 80:20 by weight.

It will be recognized from a phase diagram for gold and tin that 80:20 is a low-melting point ratio for gold and tin if alloyed. Thus the melting point of gold is 1063° C.; that of tin is 232° C.; and that of any 80:20 alloy that may be formed therefrom will be 280° C., the eutectic temperature, which comes within the definition of a low-melting point alloy as given above. It is to be understood, however, that other gold-tin weight ratios may be employed which would produce, if alloyed, a low-melting point material in the sense that such an alloy would melt at a temperature different from the eutectic temperature but lower than the melting temperature of the gold and would be a low melting point alloy within the definition thereof, as given above. However, approximately an 80:20 weight ratio is preferable because it provides a gold-rich combination which when alloyed is desirable, and which provides a eutectic, which has a congruent or isothermal melting point, which eutectic melting point is also conveniently low.

It is pointed out that a final product such as illustrated in FIG. 4, consisting of a central layer of gold clad on its opposite faces with pure tin, is not in and of itself an 80:20 gold-tin alloy but simply a material capable of becoming one if suitably heated. Its advantage is that the multilayer composite material is not brittle but of malleable form which may be coiled, stamped, formed, punched, et cetera. Thus it may be shipped without breakage and cut up into appropriately stamped and formed pieces for insertion between parts to be brazed or soldered. When so inserted, it is fired, i.e., heated to a temperature in excess of the melting temperature of tin but below the melting temperature of gold. Thus the tin melts and progressively dissolves the gold without melting it in the usual sense of the term melt but alloys with it. The brazing or soldering temperature should be selected to be somewhat in excess of the final melting temperature of the resultant alloy to insure complete alloying, if a condition of dissolution of all of the gold to form the 80:20 alloy is to be reached. The resulting 80:20 alloy has a melting point of 280° C. which is also the eutectic temperature. The resultant alloy formed at the temperature in excess of 280° C., upon cooling below 280° C., solidifies to hold together the pieces being brazed or soldered. At this stage, the solidified 80:20 gold-tin alloy may be brittle but this is inconsequential to its holding function. It will be apparent that the brazed or soldered joint may be separated at a melting temperature of 280° C.

Attention is called to the fact that other methods than solid-phase bonding may be employed for joining the layers 1 and 3, as, for example, by processes involving the production at the interfaces between bonded faces of some small amounts of brittle intermetallic compounds. Such processes are satisfactory, provided the formation of any brittle intermetallic compounds between the faces of the components is maintained below an amount which would deleteriously affect the working properties of the strip material such as shown in FIG. 4, before having the final firing heat applied thereto for conversion to an alloy in the soldering or brazing operation.

In the above example, a ratio by weight of 80:20 of gold to tin was employed. If the ratios had been, for example, 82:18 or 78:22, the melting point temperature at the soldering or brazing stage might have required increase on the order of about 50° but such alloys would under the above definition still be classed as low-melting point alloys. The significance of the selected 80:20 gold-tin ratio is (1) its desirable composition as a brazing or soldering material and (2) the comparatively low-melting temperature required to carry through the alloying during the brazing or soldering process.

Examples of other materials that may be used in carrying out the invention would be starting (FIG. 1) and ending (FIG. 4) weight ratios of gold to aluminum of 92:8 or copper to titanium of 50:50.

The above-mentioned thin characteristics of the final product, i.e., a few thousandths of an inch or so in thickness, are desirable primarily from the viewpoint of (1) providing a product which may be coiled for shipment and which is more conformable to surfaces to be joined when located in soldering position therebetween and hence also better able to wet them as melting proceeds, thereby resulting in a stronger attachment; and (2) a product which will be transformed into the alloy in a short period of heating during the brazing or soldering step. If greater thicknesses of the product are selected, correspondingly greater times of firing will be needed during the brazing or soldering step in order to complete the alloying process and therefore of course also to complete the brazing and soldering process to the 80:20 weight ratio.

While the invention as described may best be carried out by cladding both sides of one component with the other, the same method may be carried out by cladding on one side only or by analogously cladding other than flat shapes according to the invention. However, the two-faced cladding arrangement is preferred, since initial melting is accompanied by initial wetting on both adjacent faces of pieces to be joined, thus facilitating the making of an attachment.

An example of the preparation of an alloyable titanium-copper combination is as follows: A strip piece of substantially pure titanium and two strips of oxygen-free, high conductivity copper were cleaned by wire brushing. The size of the titanium strip was .098" x 2" x 4", weighing 58.00 grams and the size of each copper strip was .026" x 2" x 4", weighing 60.20 grams. These were assembled with the titanium strip between the copper strips and bonded in one pass at a 66% reduction to .050" thickness.

This resulted in a total stretch-off of the copper of 2.10 grams which was removed. No further weight adjustment was required, since the resulting ratio of titanium to copper was 49.9% copper and 50.1% titanium. The bonded assembly was then finish-rolled in finish-roll passes varying between 10% and 2% reductions, to a final gauge of .005" thick.

An example of the preparation of a low-melting point alloyable strip having a weight ratio of gold to aluminum of 92:8 is as follows: Two strips of pure aluminum .018" x 1½" x 3½" weighing 8.00 grams and a strip of fine gold .050" x 1½" x 3½" weighing 92.00 grams were cleaned by wire brushing and then assembled face to face with the gold strip between the aluminum strips. These were bonded in one pass at 58% reduction to approximately .036" thickness. In this case the stretch-off of the aluminum was not measurable in a practical sense. The as-bonded material was then rerolled in subsequent passes varying from 10% to 2% reductions, to a finish gauge of .005".

The copper-titanium example illustrates the fact that the effect on the weight ratio of stretch-off may be predetermined and the loss occasioned thereby initially supplied by providing excess of the stretch-off material at the beginning of the process so as to make up for the stretch-off loss.

The gold-aluminum example above given illustrates the fact that the desired weight ratio may be acquired at the beginning of the process and maintained throughout without any need for subsequent adjustment, due to the absence of stretch-off.

It is to be understood that the term "metals" as used herein is intended to also include alloys thereof.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

I claim:

1. A low-melting point composite product useful for brazing, soldering and the like, comprising adhered portions of at least two different malleable metals, alloys of which are brittle, said metals being gold and aluminum in a weight ratio on the order of 92:8, said weight ratio of the metals corresponding to that of a low-melting point alloy of the metals, said low-melting point being below that of at least one of the metals.

2. A low-melting point composite product useful for brazing, soldering and the like, comprising adhered sheets of at least two malleable metals, sheets of one cladding both sides of the other, alloys of which are brittle, the composite thickness of said adhered sheets being such as to form a malleable sheet adapted for forming, cutting, punching operations and the like, said metals being gold and aluminum in a weight ratio on the order of 92:8, said weight ratio of said metals corresponding to that of a low-melting point alloy of said metals, said low-melting point being below that of at least one of the metals.

3. A low-melting point composite product useful for brazing, soldering and the like, comprising adhered portions of at least two different malleable metals, alloys of which are brittle, said metals being gold and tin in a weight corresponding to that of a low-melting point alloy of the metals, said low-melting point being below that of at least one of the metals.

4. A low-melting point composite product useful for brazing, soldering and the like, comprising adhered sheets of at least two malleable metals, sheets of one cladding both sides of the other, alloys of which are brittle, the composite thickness of said adhered sheets being such as to form a malleable sheet adapted for forming, cutting, punching operations and the like, said metals being gold and tin in a weight ratio on the order of 80:20, said weight ratio of said metals corresponding to that of a low-melting point alloy of said metals, said low-melting point being below that of at least one of the metals.

5. A low-melting point composite product useful for brazing, soldering and the like, comprising adhered portions of at least two different malleable metals forming a pair, alloys of which are brittle, said pair of metals being selected from the group of pairs consisting of gold and aluminum, and gold and tin, respectively, the weight ratio in the case of gold and aluminum being on the order of 92:8, and the weight ratio in the case of gold and tin being on the order of 80:20, each of said weight ratios corresponding to that of the low-melting point alloy of the components of the respective pair, each low-melting point being below that of the metal component having the highest melting point in the respective pair.

6. A low-melting point composite product useful for brazing, soldering and the like, comprising adhered sheets of at least a pair of malleable metals, sheets of one metal of the pair of metals cladding both sides of a sheet of the other metal of the pair of metals, alloys of which pair of metals are brittle, the composite thickness of said adhered sheets being such as to form a malleable sheet adapted for forming, cutting, punching operations and the like, said pair of metals being selected from the group of pairs consisting of gold and aluminum, and gold and tin, the weight ratio in the case of the gold and aluminum pair being on the order of 92:8, and the weight ratio in the case of the gold and tin pair being on the order of 80:20, each of said weight ratios corresponding to that of a low-melting point alloy of the components of the respective pair, each low-melting point being below that of the metal component having the highest melting point of the respective pair.

References Cited in the file of this patent

UNITED STATES PATENTS

| | | |
|---|---|---|
| 827,378 | Lewis | July 31, 1906 |
| 1,008,970 | Kessler | Nov. 14, 1911 |
| 1,089,773 | Kraus | Mar. 10, 1914 |
| 1,248,506 | Lavine | Dec. 4, 1917 |
| 1,940,850 | Derby | Dec. 26, 1933 |
| 1,956,467 | Palm | Apr. 24, 1934 |
| 1,956,469 | Palm | Apr. 24, 1934 |
| 2,362,893 | Durst | Nov. 14, 1944 |
| 2,732,321 | Gill | Jan. 24, 1956 |
| 2,753,623 | Boessenkool | July 10, 1956 |
| 2,793,423 | Stumbock | May 28, 1957 |
| 2,854,737 | Gray | Oct. 7, 1958 |
| 2,857,663 | Beggs | Oct. 28, 1958 |
| 3,065,539 | Hannegan | Nov. 27, 1962 |

UNITED STATES PATENT OFFICE
CERTIFICATE OF CORRECTION

Patent No. 3,169,048                                   February 9, 1965

Thomas E. McGinn

It is hereby certified that error appears in the above numbered patent requiring correction and that the said Letters Patent should read as corrected below.

Column 5, line 21, for "cooper-titanium" read -- copper-titanium --; column 6, line 1, for "weight" read -- weight ratio on the order of 80:20, said weight ratio of the metals".

Signed and sealed this 6th day of July 1965.

(SEAL)
Attest:

ERNEST W. SWIDER                                        EDWARD J. BRENNER
Attesting Officer                                            Commissioner of Patents